(12) United States Patent
Lee

(10) Patent No.: US 6,669,300 B1
(45) Date of Patent: Dec. 30, 2003

(54) STRUCTURE OF A HEADREST

(76) Inventor: Mei-Huei Lee, PO Box 82-144, Taipei (TW)

( * ) Notice: Subject to any disclaimer, the term of this patent is extended or adjusted under 35 U.S.C. 154(b) by 0 days.

(21) Appl. No.: 10/309,103

(22) Filed: Dec. 4, 2002

(51) Int. Cl.[7] ................................. A47C 7/36
(52) U.S. Cl. ....................................... 297/397
(58) Field of Search ...................... 297/391, 397, 297/410

(56) References Cited

U.S. PATENT DOCUMENTS

| | | | | |
|---|---|---|---|---|
| 4,154,478 A | * | 5/1979 | Cohune | |
| 5,015,036 A | * | 5/1991 | Fergie | |
| 5,544,378 A | * | 8/1996 | Chow | |
| 5,964,504 A | * | 10/1999 | Hogan et al. | |
| 6,435,617 B1 | * | 8/2002 | McNair | |

* cited by examiner

Primary Examiner—Milton Nelson, Jr.
(74) Attorney, Agent, or Firm—Leong C. Lei

(57) ABSTRACT

A headrest includes a cover, at least a lug having two slots and having a bottom side secured to a top edge of the cover, at least a strap having an end fixedly secured to a back side of the cover and adapted to extend through the lug to bind the headrest on a headrest of a seat, whereby the headrest can be adjusted along the headrest of the seat in stepless manner and can be adjusted to a position below the headrest of the seat to cover a gap between the headrest of the seat and a backrest of the seat.

5 Claims, 4 Drawing Sheets

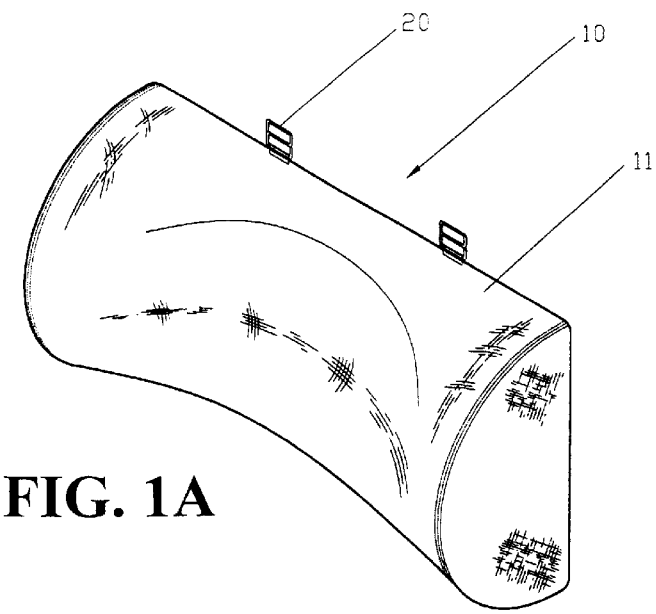
FIG. 1A
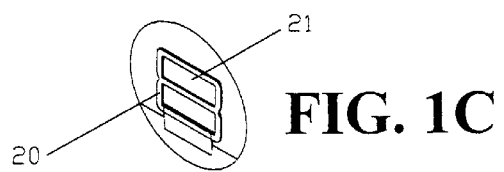
FIG. 1C
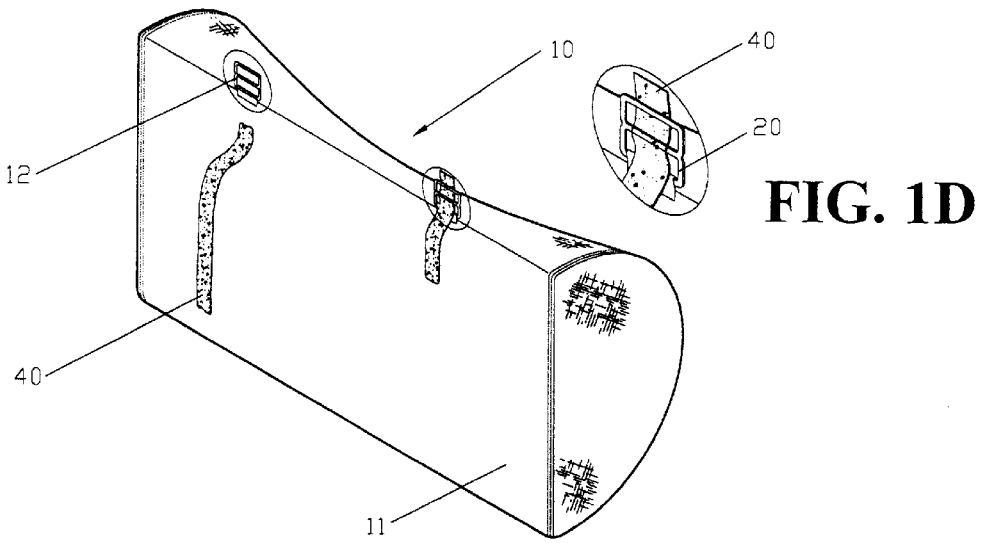
FIG. 1D
FIG. 1B

STRUCTURE OF A HEADREST

BACKGROUND OF THE INVENTION

1. Field of the Invention

This invention is related to an improvement in the structure of a headrest, and in particular to one which can be adjusted in position in stepless manner as desired.

2. Description of the Prior Art

With rapid economic growth taking place, many kinds of industries have also been growing, and the number of automobiles have also increased and become the daily mode of transport for the average consumer. As a result, roads are insufficient for coping with today's traffic, and must be often maintained and repaired repeatedly, so that many roads are always under construction, causing pits and holes in the roads. This in turn causes discomfort for the driver and passengers.

Referring to FIGS. 2A, 2B and FIG. 3, the headrest 31 and the back rest 32 are assembled together and the headrest can be moved up and down for adjusting its position according to the driver or passenger's preference. However, this kind of headrest cannot solve the problem of the gap 33 between the headrest and the backrest. Hence an additional headrest attached to the headrest of the seat has been developed. However, this additional headrest cannot be moved independently, and has to be moved in union with the headrest of the seat, thereby causing much inconvenience. Furthermore, this additional headrest cannot solve the problem of the gap between the headrest and the backrest.

U.S. Pat. No. 3,195,953 discloses an adjustable headrest. According to FIG. 5 of this patent, the back of the headrest cover has four slots for the insertion of belts. The upper ends of the belts are provided with a hook, so that the headrest can be mounted on the top of the backrest of a seat. However, the length of the belts is very long, because the tension can easily become loose, and thus the headrest can easily fall down from either side of the backrest. Furthermore, it is difficult to tighten the belts, so that the belts cannot be tightened completely on the surface of the backrest, and so the frictional force between the surface of the belts and the backrest is diminished, and the headrest can easily fall from its position on the backrest.

SUMMARY OF THE INVENTION

This invention is related to an improvement in the structure of a headrest, and in particular to one which can be adjusted in position in stepless manner as desired.

According to a preferred embodiment of the present invention, a headrest includes a cover, at least a lug having two slots and having a bottom side secured to a top edge of the cover, at least a strap having an end fixedly secured to a back side of the cover and adapted to extend through the lug to bind the headrest on a headrest of a seat, whereby the headrest can be adjusted along the headrest of the seat in stepless manner and can be adjusted to a position below the headrest of the seat to cover a gap between the headrest of the seat and a backrest of the seat.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1A is a perspective view of the present invention;

FIG. 1B is rear perspective view of the present invention;

FIG. 1C is an enlarged view of a portion of FIG. 1B;

FIG. 1D is an enlarged view of another portion of FIG. 1B;

DETAILED DESCRIPTION OF THE PREFERRED EMBODIMENT

Figure 2A:
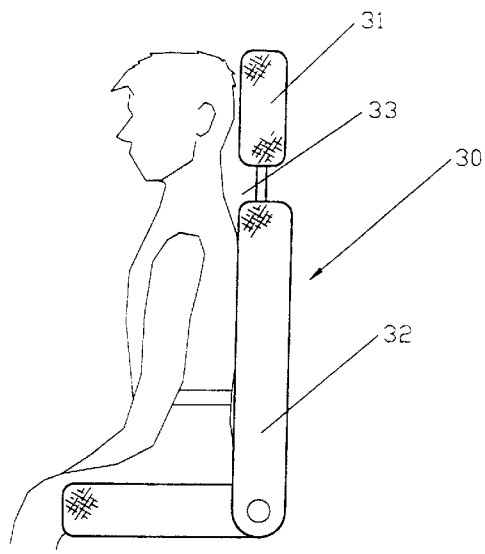
FIG. 2A illustrates a man in a seat with a gap at his neck position.
Figure 2B:
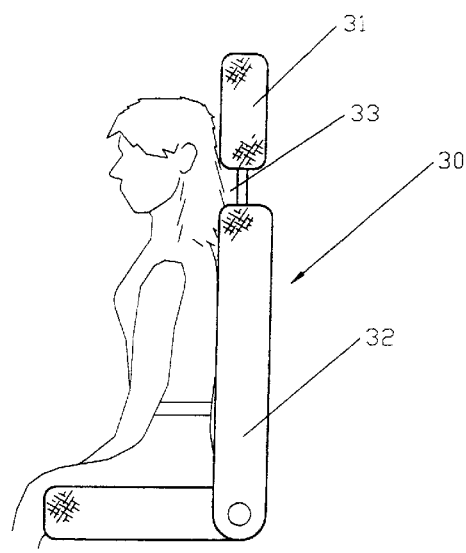
FIG. 2B illustrates a woman in a seat with a gap at her neck position.
Figure 3:
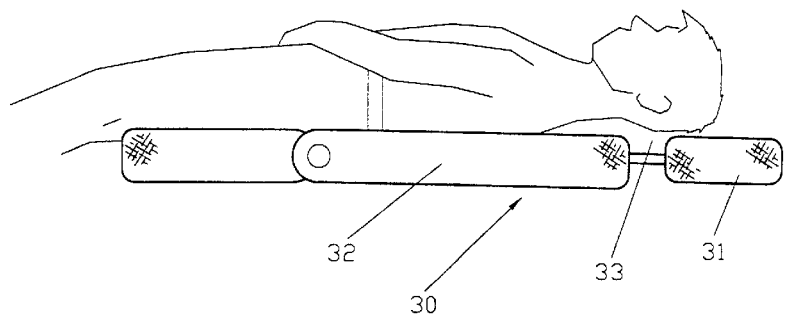
FIG. 3 illustrates a man lying down on a seat with a gap at his neck position.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

With reference to the drawings and in particular to FIGS. 1A, 1B, 1C and 1D thereof, the headrest 10 according to the present invention comprises an cover 11, two lugs 20 having a bottom connected with the top edge of the cover 11, and two straps 40 having an end fixedly secured to the back side of the headrest 10. The lug 20 may be made of metal, plastic or cloth as required. The lug 20 is formed with two slots 21.

Figure 4:
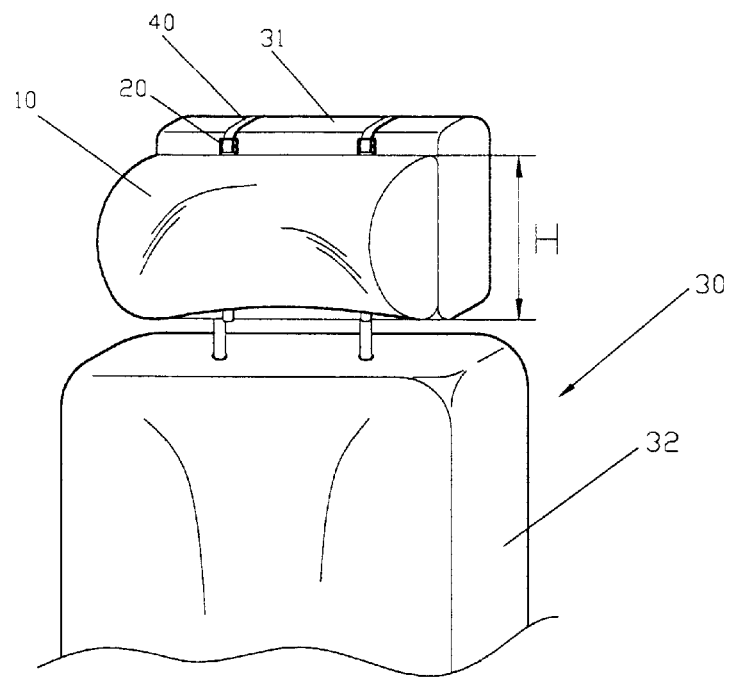
FIG. 4 illustrates how the present invention is mounted on the headrest of the seat of an automobile.
Figure 5:
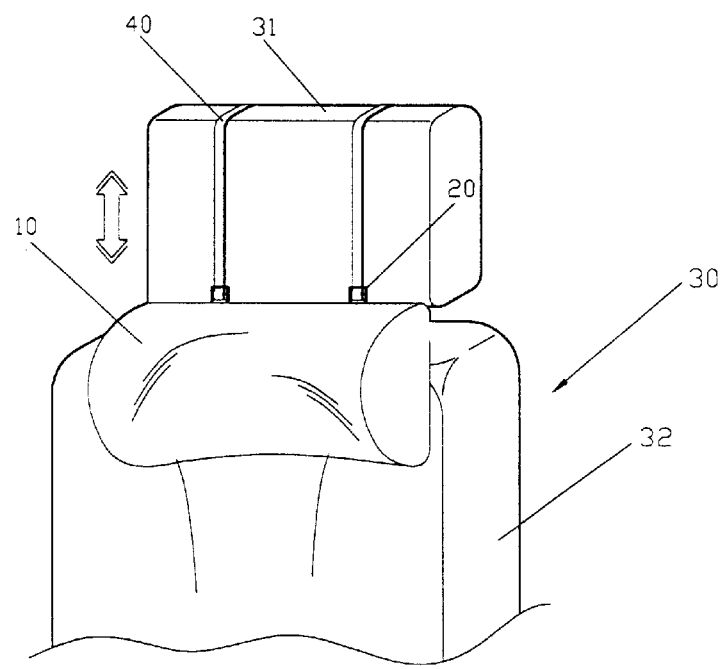
FIG. 5 illustrates how to adjust the position of the present invention.

Referring to FIGS. 4 and 5, the headrest 10 is mounted to a headrest 31 of a seat 30 by extending the straps 20 through the lugs 20 and tying the headrest 10 on the headrest 31 by the straps 20, thereby enabling the headrest 31 to be adjusted in different positions as desired and therefore providing a comfortable support for persons with different height.

Figure 6B:
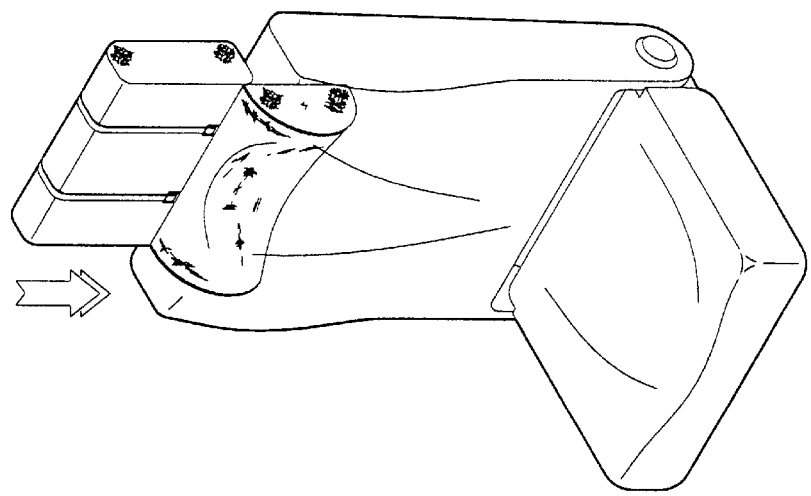
FIGS. 6A and 6B are working views of the present invention.
Figure 6A:
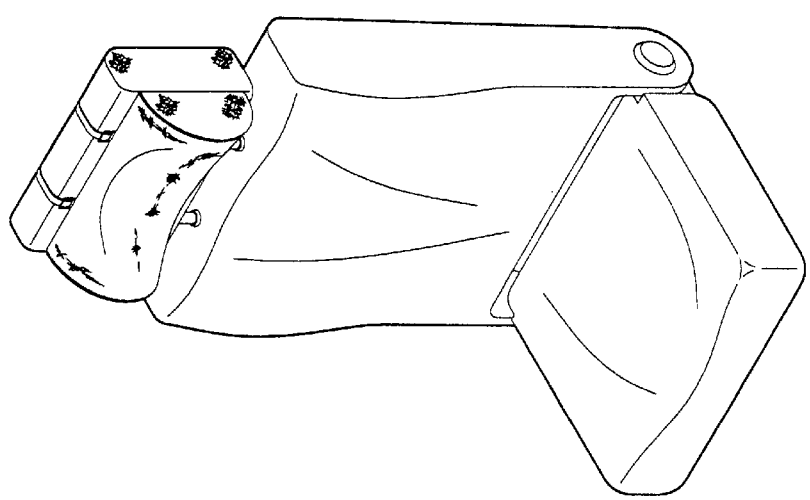

As shown in FIGS. 6A and 6B, at least one lug 20 and at least one strap are required. However, the number of the lug 20 and the strap 40 may be changed as desired. Hence, the headrest 10 can be adjusted along a distance of H along the headrest 31 of the seat 30 thus allowing the headrest 10 to cover the gap between the headrest 31 and the backrest 32 of the seat 30. Furthermore, the headrest 10 can be adjusted along a distance between one-half height of the headrest 31 and one and one-half height of the headrest 31.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A headrest comprising:

a cover;

at least a lug having two slots and having a bottom side secured to a top edge of said cover;

at least a strap having an end fixedly secured to a back side of said cover and adapted to extend through said lug to bind said headrest on a headrest of a seat;

whereby said headrest can be adjusted along said headrest of said seat in stepless manner and can be adjusted to a position below said headrest of said seat to cover a gap between said headrest of said seat and a backrest of said seat.

2. The headrest as claimed in claim 1, wherein said lug is made of cloth.

3. The headrest as claimed in claim 1, wherein said headrest is adjustable along a distance between one-half height of said headrest of said seat and one and one-half height of said headrest.

4. The headrest as claimed in claim 1, wherein said lug is made of metal.

5. The headrest as claimed in claim 1, wherein said lug is made of plastic.

* * * * *